United States Patent [19]

Paurat et al.

[11] Patent Number: 5,197,824
[45] Date of Patent: Mar. 30, 1993

[54] SYSTEM FOR PROTECTING GROUND WATER UNDER A DUMP

[76] Inventors: Friedrich W. Paurat, Kasselweg 29, D-4230 Wesel 1; Roland Paurat, Blumenstrasse 11, D-4230 Wesel 13, both of Fed. Rep. of Germany

[21] Appl. No.: 746,646

[22] Filed: Aug. 15, 1991

[30] Foreign Application Priority Data

Aug. 17, 1990 [DE] Fed. Rep. of Germany ....... 4026048
Nov. 13, 1990 [DE] Fed. Rep. of Germany ....... 4036103

[51] Int. Cl.$^5$ .......................... B09B 1/00; E02D 31/00
[52] U.S. Cl. ..................................... 405/128; 405/36; 405/129
[58] Field of Search ...................... 405/36, 43, 51, 128, 405/129, 270; 166/311

[56] References Cited

U.S. PATENT DOCUMENTS

| | | | |
|---|---|---|---|
| 3,561,534 | 2/1971 | Dendy | 166/311 |
| 4,430,021 | 2/1984 | Wagner et al. | 405/129 |
| 4,624,604 | 11/1986 | Wagner et al. | 405/128 |
| 4,753,551 | 6/1988 | Brueggemann et al. | 405/128 |
| 4,846,604 | 7/1989 | Holtmann | 405/128 |
| 4,966,492 | 10/1990 | Poyda | 405/128 |
| 4,981,080 | 1/1991 | Elstone | 405/128 X |

Primary Examiner—David H. Corbin
Attorney, Agent, or Firm—Herbert Dubno; Andrew Wilford

[57] ABSTRACT

An installation for protecting ground water underneath a dump has at least one tunnel driven longitudinally through the ground underneath the dump and an array of casing pipes passing through the ground, each having a lower end opening into the tunnel, and each formed with a multiplicity of throughgoing holes. These casing pipes are longitudinally spaced to receive liquid from their surroundings and conduct it to the tunnel. Respective inner tubes spacedly received in the casing pipes are provided to service the respective casings and their holes. These casings are installed using standard oil-drilling equipment and techniques. Once the tunnel has been driven the bores are slant drilled to it and standard perforated well casings are installed in these slant-drilled bores.

7 Claims, 3 Drawing Sheets

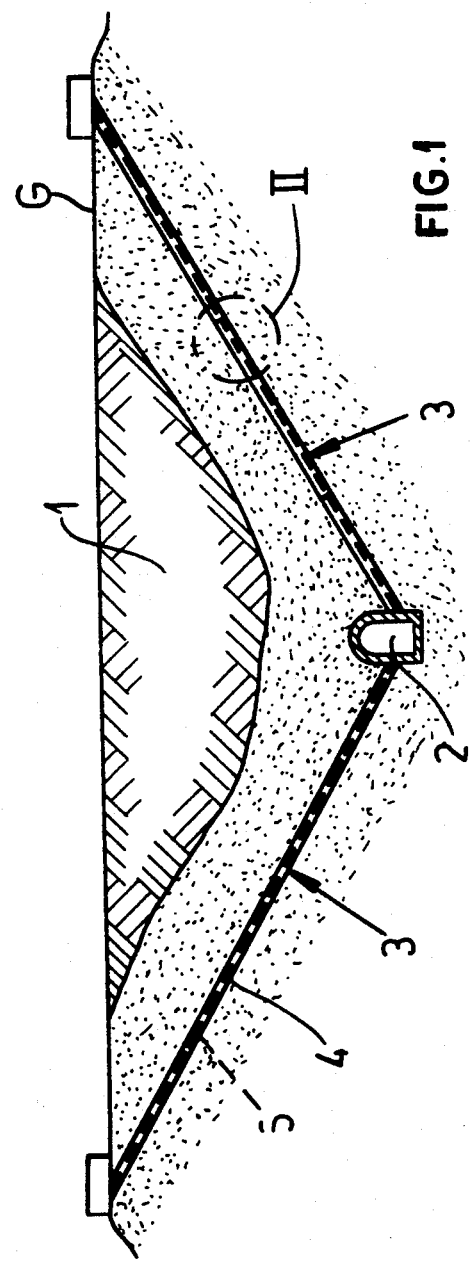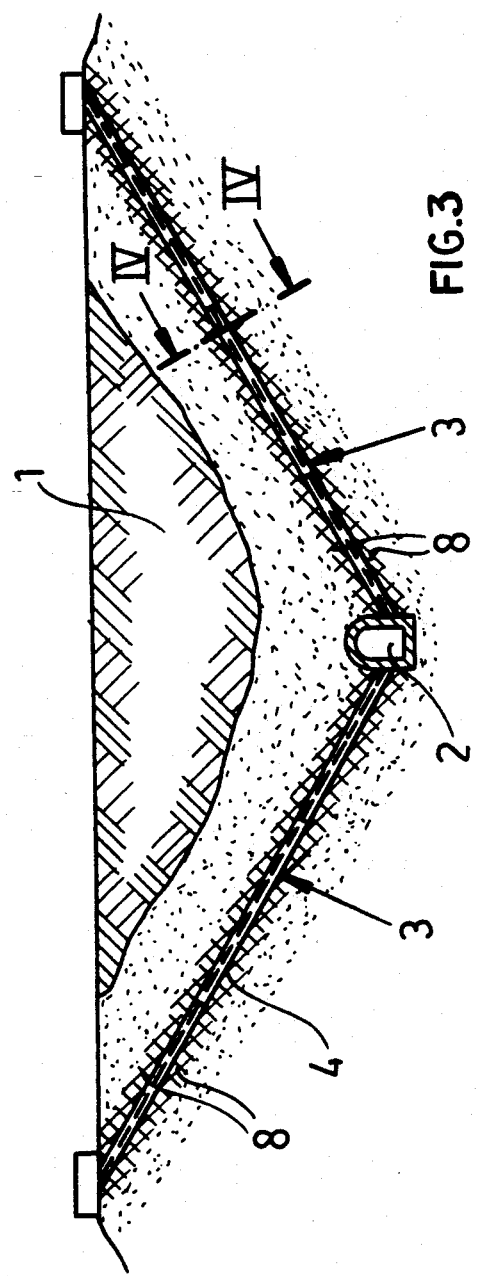

SYSTEM FOR PROTECTING GROUND WATER UNDER A DUMP

FIELD OF THE INVENTION

The present invention relates to a system for protecting the ground water under a dump. More particularly this invention concerns an installation and method for thus protecting subterranean ground water.

BACKGROUND OF THE INVENTION

A system described in copending patent application 07,714,250 filed 11 June 1991 for isolating a dump sitting on the ground has three different structures which ar installed under the dump sequentially, as needed. The first structure includes a tunnel driven longitudinally through the ground underneath the dump and an array of drainage pipes passing through the ground and each having a lower end opening into the tunnel and an upper end at the surface. The second structure includes a water barrier in the ground around at least some of the drainage pipes. The third structure includes a water-impervious mass of backfill in a slit underneath the barrier and having a lower end at the tunnel and an upper end at the surface. Unpublished and withdrawn German patent application 4,018,821 describes a system where drainage in such a dump-protection installation is assisted by providing a compressed-air arrangement for keeping the perforations in the drainage pipe clear. Such a system is used in order to prevent blockages of the drainage pipe from rendering the installation useless or requiring that it be dug up and serviced and/or replaced.

The main problem with the known solutions is that they require that expensive mining techniques be applied to install them. The necessary tunnels and slits must be driven and cut by equipment that is expensive to own and operate. Instead of using spoil cut from the face as backfill, special water impervious fill must be moved into the job, along with the requisite vapor-barrier foils. These procedures are necessary where the ground is stone or clay, where there is insufficient percolation to allow the drainage pipes to draw off the water leaching down from the dump. Thus it is standard to install leach pipes that lead to the zero-pressure drainage tunnel, as the pressure in the surrounding stone or ground is invariably somewhat higher.

OBJECTS OF THE INVENTION

It is therefore an object of the present invention to provide an improved system for protecting the ground water under a dump.

Another object is the provision of such an improved system for protecting the ground water under a dump which overcomes the above-given disadvantages, that is which can be installed rather easily, without the use of expensive mining equipment.

A further object is to provide an improved method of protecting ground water under a dump, and of installing the inventive protection system.

SUMMARY OF THE INVENTION

An installation for protecting ground water underneath a dump according to the invention has at least one tunnel driven longitudinally through the ground underneath the dump and an array of casing pipes passing through the ground, each having a lower end opening into the tunnel, and each formed with a multiplicity of throughgoing holes. These casing pipes are longitudinally spaced to receive liquid from their surroundings and conduct it to the tunnel. Respective inner tubes spacedly received in the casing pipes are provided to service the respective casings and their holes. The leach field according to this invention need only be provided underneath those area of the dump where the liquid leaching down from it can travel; it need not be provided, for instance, under impervious solid-rock layers.

This system therefore allows the leach field formed by the casings to be installed using standard oil-drilling equipment and techniques. It is a fairly simple job, once the tunnel has been driven, to slant drill to it and to install standard perforated well casings in these slant-drilled bores.

According to the invention each casing pipe is formed of a plurality of joined casing-pipe sections and each tube is similarly formed of a plurality of joined tube sections. Furthermore the tubes are provided with means for cleaning the holes in the form of nozzles for directing sprays of cleaning liquid at the holes. This is opposite the standard oil-drill string where the casing merely serves to hold back the surrounding material and the tube is used to pull out the oil that comes through the casing holes into the casing.

The method according to the invention comprises first driving at least one service tunnel longitudinally through the ground underneath the dump and then drilling an array of bores from the surface down to the tunnel and installing in each of these bores a respective casing pipe having a lower end opening into the tunnel and each formed with a multiplicity of throughgoing holes. Subsequently each casing pipe is fitted with a respective inner tube provided with means for servicing the respective casings and their holes.

Furthermore in accordance with this invention it is possible to pull the casings and tubes out of the bores into the service tunnel. More particularly, periodically a new section is added to the upper end of at least one of the casings, the one casing is pushed through its bore down into the tunnel, and an end section is removed from the one casing in the tunnel. This allows the leach field to be serviced and repaired fairly easily.

According to another feature of the invention a water-proofing medium is injected from the casings through their holes into the ground surrounding the casings. This allows the ground to be prepared underneath the dump so that any leachant is conducted to the holes of the casings.

It is also possible in accordance with the invention to periodically spray cleaning water into the casings from the tubings to clear the casings. This water is sprayed at the holes of the casings to clear same.

BRIEF DESCRIPTION OF THE DRAWINGS

The above and other objects, features, and advantages will become more readily apparent from the following, reference being made to the accompanying drawing in which:

FIG. 1 is a small-scale vertical section illustrating the system and method of the invention;

FIG. 3 is a view like FIG. 1 of another system according to the invention; and

SPECIFIC DESCRIPTION

As seen in FIG. 1 a dump 1 that is partially recessed in the ground G lies above a tunnel 2 driven longitudinally (perpendicular to the plane of the view of FIG. 1) and normally having opposite ends that open at the surface, with upwardly inclined end sections leading up from the illustrated horizontal stretch of the tunnel 2. To each side of the tunnel is a leach field 3 adapted to capture any liquid leaching down through the ground from the dump 1. Such leachant is conducted by the leach field down to the tunnel 2 where it is collected and pumped out.

Figure 2:
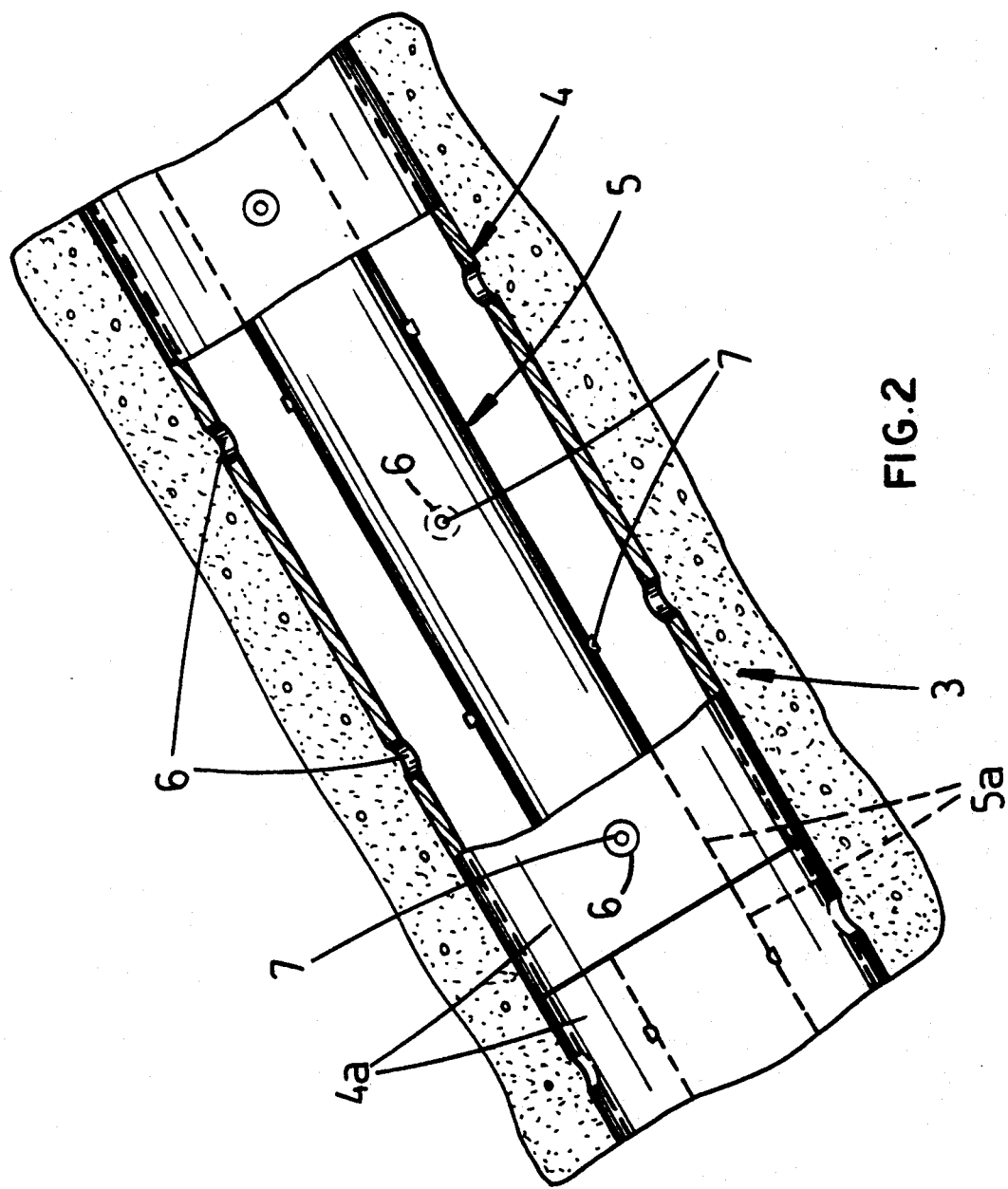
FIG. 2 is a large-scale view of the detail indicated at II in FIG. 1.

FIG. 2 shows how the leach field is formed by a plurality of standard casings 4 each formed of a plurality of cylindrical casing sections 4a. Inside the casing is a smaller-diameter tube 5 itself formed by a plurality of tube sections 5a. The casing 4 itself is formed with radially throughgoing holes 6 and the tube 5 is formed in line with each of these holes 6 with a nozzle 7. Thus it is possible to pressurize the tube 5 with water so that the streams emitted by the nozzles 7 clear the holes 6 while the resultant flow will wash any sediment in the casing 4 away down to the tunnel 2.

The casings 6 are installed in the standard manner used in an oil-drilling operation. Thus bores are driven and the casings are pushed along behind the drilling bit. Once the casings are in place, the tubes 5 are fitted to them. If necessary the lower section of a casing 4 can be pushed into the tunnel 2 and taken off to allow the casing to be renewed by adding sections to its top end and pushing the casing 4 down its bore.

Figure 4:
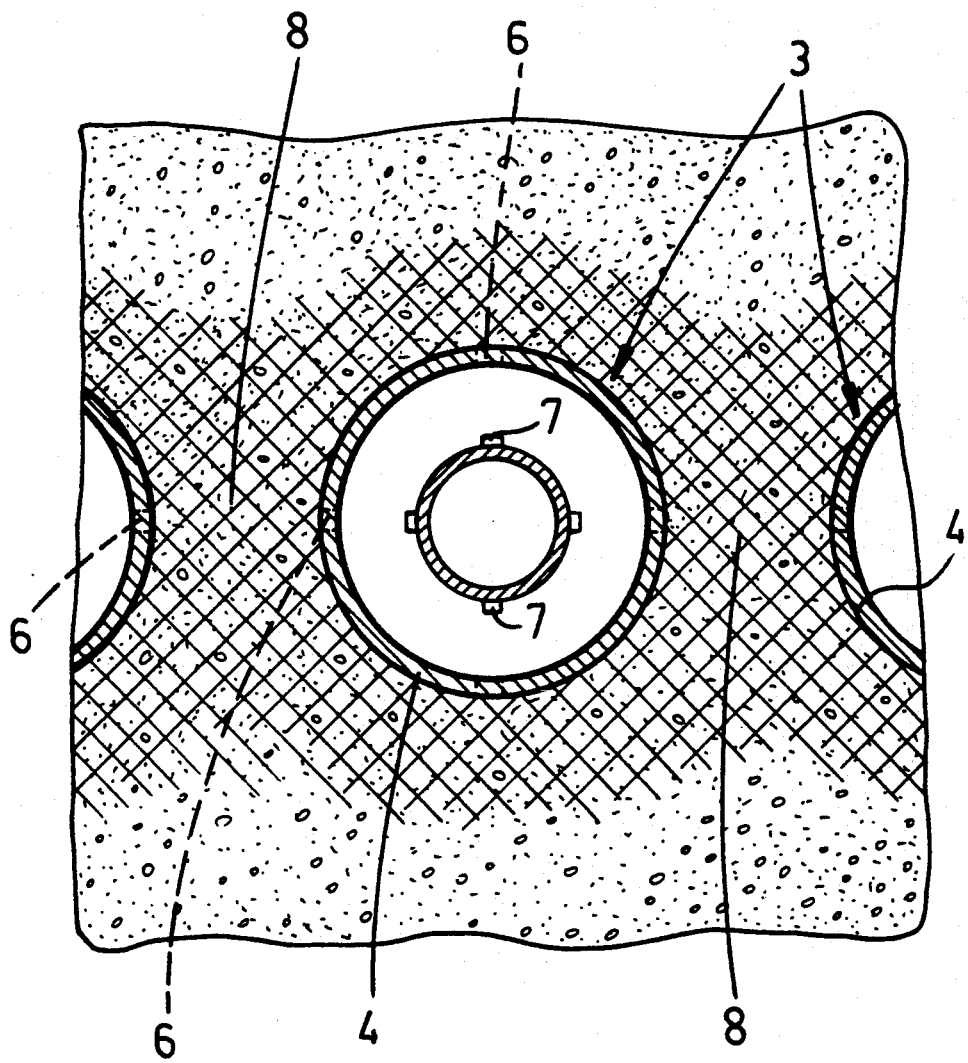
FIG. 4 is a section taken along line IV—IV of FIG. 3.

FIGS. 3 and 4 show a similar arrangement, with identical references used for functionally and structurally identical elements. Here however the casings 4 are used, before insertion of the tubes 5, for injecting a sealant or waterproofing substance 8 into the surrounding ground. The sealant mass 8 is so arranged and deployed that any descending leachant is conducted to the holes 6.

We claim:

1. An installation for protecting ground water underneath a dump, the installation comprising:
    at least one tunnel driven longitudinally through the ground underneath the dump;
    an array of casing pipes passing through the ground, each having a lower end opening into the tunnel, and each formed with a multiplicity of throughgoing holes, the casing pipes being longitudinally spaced to receive liquid from their surroundings into their holes and conduct it to the tunnel; and
    respective inner tubes generally permanently mounted in the casing pipes, spacedly received int eh casing pipes, and each formed with radially throughgoing holes each aligned with a respective hole of the respective casing pipe.

2. The ground-water protection installation defined in claim 1 wherein each casing pipe is formed of a plurality of joined casing-pipe sections and each tube is similarly formed of a plurality of joined tube sections.

3. The ground-water protection installation defined in claim 1 wherein the tube holes are provided with nozzles for directing sprays of cleaning liquid at the respective casing-pipe holes.

4. A method of protecting ground water underneath a dump, the method comprising the steps of:
    a) driving at least one service tunnel longitudinally through the ground underneath the dump;
    b) drilling an array of bores from the surface down to the tunnel and installing in each of these bores a respective casing pipe having a lower end opening into the tunnel and each formed with a multiplicity of through going holes, whereby the array of bores forms a leach field;
    c) generally permanently installing in each of the casing pipes a respective inner tube provided at each of the casing-pipe holes with a respective spray hole;
    d) intercepting leachant percolating down through the ground from the dump in the leach field and collecting the intercepted leachant in the tunnel; and
    e) pumping the leachant out of the tunnel.

5. The ground-water protection method defined in claim 4 further comprising the step of
    pulling the casings and tubes out of the bores into the service tunnel.

6. The ground-water protection method defined in claim 5, further comprising the step after step c) of:
    d) periodically spraying cleaning water into the casings from the holes of the tubings to clear the holes of the casings.

7. The ground-water protection method defined in claim 5 wherein the casings are made of a plurality of sections, the method further comprising the steps after step c) of:
    d) periodically adding a new section to the upper end of at least one of the casings;
    e) pushing the one casing through its bore down into the tunnel; and
    f) removing an end section in the tunnel from the one casing.

* * * * *